Patented Sept. 11, 1923.

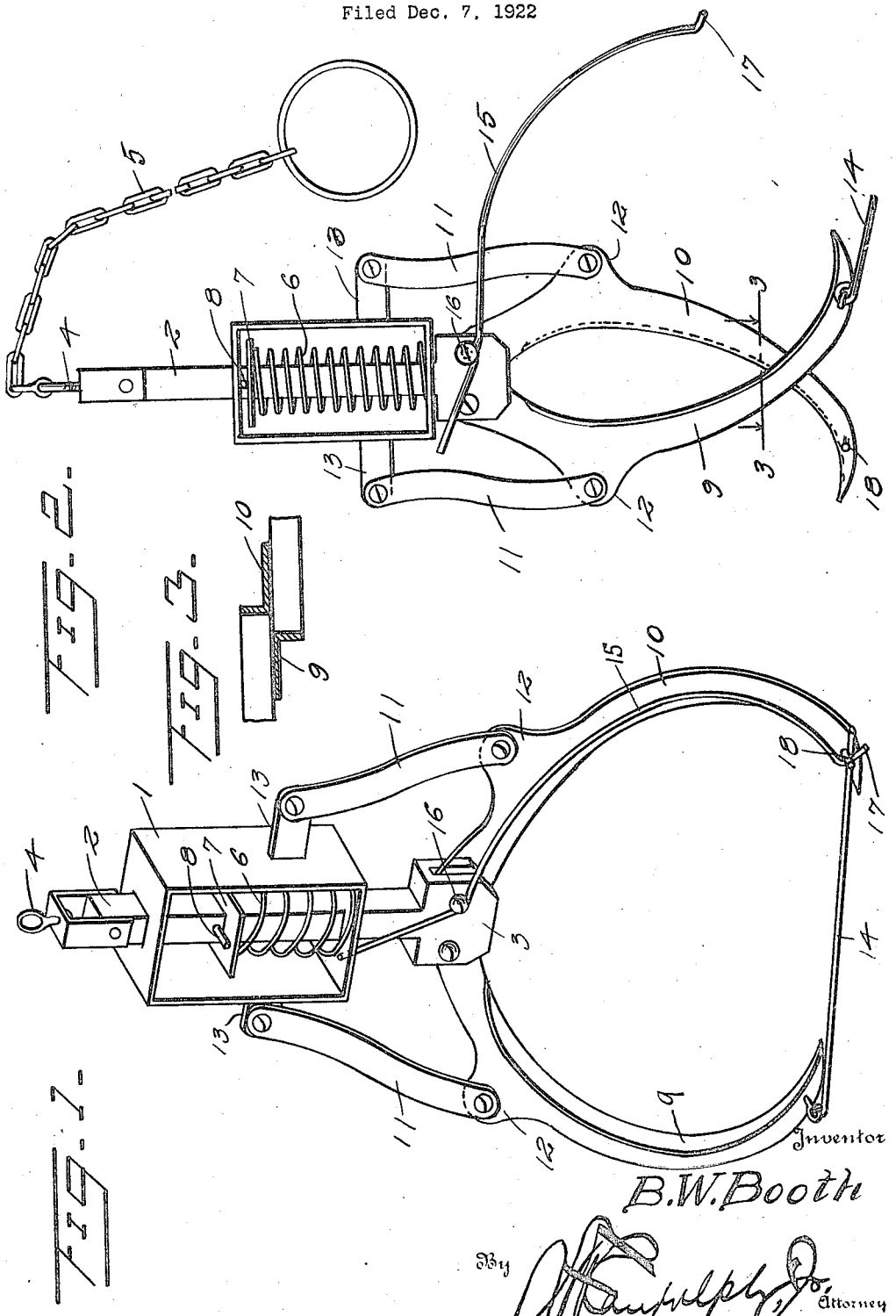

1,467,832

UNITED STATES PATENT OFFICE.

BENJAMIN W. BOOTH, OF KETCHIKAN, ALASKA.

ANIMAL TRAP.

Application filed December 7, 1922. Serial No. 605,439.

*To all whom it may concern:*

Be it known that I, BENJAMIN W. BOOTH, a citizen of the United States, residing at Ketchikan, in Division S. 1 and Territory of Alaska, have invented certain new and useful Improvements in Animal Traps; and I do hereby declare the following to be a full, clear, and exact description of the invention, such as will enable others skilled in the art to which it appertains to make and use the same.

The invention provides a trap for catching fur-bearing animals such as mink, marten and wild fox, and which does not require to be baited and which when set is not liable to be covered by snow, since the trap is suspended and disposed in the path of the animal so as to be tripped either when leaving its home or upon returning thereto, said trap being so constructed as to grip the body rather than the leg, thereby precluding the escape of the animal or serious injury thereto.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a perspective view of a trap embodying the invention, showing the relation of the parts when the same is set, Figure 2 is an elevation showing the relation of the parts when the trap is sprung, and Figure 3 is a sectional detail view on the line 3—3 of Figure 2.

Corresponding and like parts are referred to in the following description and designated in the several views of the drawings by like reference characters.

The trap comprises an oblong rectangular frame 1 in which is slidably mounted a stem 2 having a head 3 at its lower end and a swivel connection 4 at its upper end for the reception of a suspending element 5 such as a chain or wire cord. An expansible helical spring 6 is mounted upon the stem 2 between the lower end of the frame 1 and a plate 7 held in determinate position upon the stem by means of a pin 8. The tension of the spring 6 may be varied by rotating the same about the stem 2 to vary its connection with the plate 7 as will be readily understood.

Jaws 9 and 10 are pivoted to the head 3 and are similarly curved in opposite directions and are so shaped as to grip opposite sides of the animal without inflicting serious injury thereto. The lower portion of the head 3 is provided with a kerf in which the upper ends of the jaws 9 and 10 are pivoted with the result that said jaws are maintained in substantially the same plane so as to grip opposite sides of the body of the animal and preclude escape thereof. Links 11 connect the jaws with opposite sides of the frame 1, each of the jaws having an outwardly disposed ear 12 to which the lower end of the link 11 is pivoted, the upper end of the link being pivoted to an offstanding projection 13 of the frame 1. The ears 12 are disposed a short distance from the pivotal ends of the jaws and when the pivotal ends of the jaws are drawn upwardly towards the frame 1, said jaws turn about their pivotal connection with the links 11 which results in moving the jaws inward so as to grip the animal therebetween.

The trigger mechanism comprises a trip 14 and a catch 15. The trip 14 preferably consists of a stout wire or light rod pivoted at one end to the lower end of one of the jaws, as 9, and adapted to extend across the space between the jaws when the trap is set and engage the lower end of the companion jaw. The catch 15 likewise consists of a stout wire or light rod pivotally connected intermediate its ends to the head 3, as indicated at 16, and having its lower end bent into the form of a hook 17 which is adapted to engage a pin 18 projecting laterally from the lower end of the jaw 10.

When the trap is set, the jaws 9 and 10 are separated and this results in a compression of the spring 6, since the stem 2 is drawn downward in the frame 1. The hook end 17 of the catch is engaged with the pin 18 and the upper end of the catch engages the lower end of the frame 1, thereby holding the stem 2 projected and the jaws separated against the tension of the spring 6. The pin 18 is sufficiently long so as to engage the hook 17 when the trip 14 is disposed between said catch and the jaw 10. Lateral pressure against the trip 14 in one direction will effect disengagement of the hook end 17 from the pin 18, whereby to release the spring 6 which in reacting draws the stem 2 upwardly and effects a closing of the jaws in the manner stated. When the trap is set, it is suspended from a stake, not shown, or other support by means of a suitable connection 5. The trap is set in the path of the animal so that when pursuing its usual haunts, the trip will be actuated by contact of the animal therewith, with the result that the trap will be sprung and the jaws thereof close about the body of the animal and hold the latter until the trapper appears upon the scene.

What is claimed is:

1. An animal trap comprising a frame, a stem slidably mounted in the frame, a spring normally tending to hold the stem in withdrawn position, complemental jaws carried by the stem, a catch pivoted to the stem and adapted to engage the said frame and one of the jaws to hold the stem projected and the jaws in open position, and a trip extending across the space formed between the jaws when the latter are in open position and adapted to be actuated by the animal to effect release of the catch to admit of automatic closing of the jaws to grip and hold the animal.

2. An animal trap comprising a frame, a stem slidable in the frame, a spring normally tending to hold the stem in withdrawn position, complemental jaws pivoted to the stem, a link connection between each of the jaws and frame, a catch pivoted to the stem and adapted to engage the said frame and one of the jaws to hold the latter in open position and the stem projected, and a trip extending across the space formed between the jaws when the latter are open and adapted to be actuated by the animal to effect release of the catch to permit automatic closing of the jaws.

3. An animal trap comprising a frame, a stem slidable in the frame and provided at its lower end with a head, a spring normally tending to hold the stem in withdrawn position, complemental jaws pivoted to the head of the stem, links connecting the jaws with opposite sides of the frame, a catch pivoted to the stem and adapted to engage the frame to hold the stem projected and the jaws open, a pin projecting laterally from one of the jaws to engage the catch to hold it in operative position, and a trip pivoted to the opposite jaw at one end and adapted to extend across the space formed between the jaws when the latter are open and having its opposite end coming between the catch and the jaw provided with the catch engaging pin.

In testimony whereof I affix my signature in presence of two witnesses.

BENJAMIN W. BOOTH.

Witnesses:
H. M. STACKPOLE,
J. H. DAVIES.